United States Patent [19]
[11] 3,857,793
[45] Dec. 31, 1974
Pappalardo et al.

[54] FLUORESCENT ORGANIC COMPOUND LASER

[75] Inventors: Romano G. Pappalardo, Sudbury, Mass.; Samir A. Ahmed, Manhattan, N.Y.

[73] Assignee: GTE Laboratories Incorporated, Waltham, Mass.

[22] Filed: May 1, 1973

[21] Appl. No.: 356,259

[52] U.S. Cl......... 252/301.3 R, 330/4.3, 331/94.5 G
[51] Int. Cl.............................................. H01s 3/22
[58] Field of Search............ 252/301.2 R; 331/94.5; 330/4.3

[56] References Cited

OTHER PUBLICATIONS

Tolstorozhev et al., Optics & Spectroscopy, Vol. 29, No. 4, October, 1970, pp. 374–376, (QC 350)64.

Borisevich et al., Chemical Abstract No. 20120z, Chemical Abstracts, Vol. 73, No. 4, July 27, 1970.

Karlov et al., JETP Letters (ZhETF Pis. Red.) Vol. 8, July 5, 1968, pp. 22–25 (orig. Russ), pp. 12–14 (English).

*Primary Examiner*—Robert J. Webster
*Attorney, Agent, or Firm*—Irving M. Kriegsman

[57] ABSTRACT

A discharge excited laser wherein the active material is a vaporized highly fluorescent aromatic organic compound, such as perylene, coronene, p-terphenyl, 1,6-diphenyl-hexa-1,3,5-triene, 9.10-diphenylanthracene, and 1,4-bis-2-(4-methyl-5-phenyloxazolyl) benzene.

2 Claims, 1 Drawing Figure

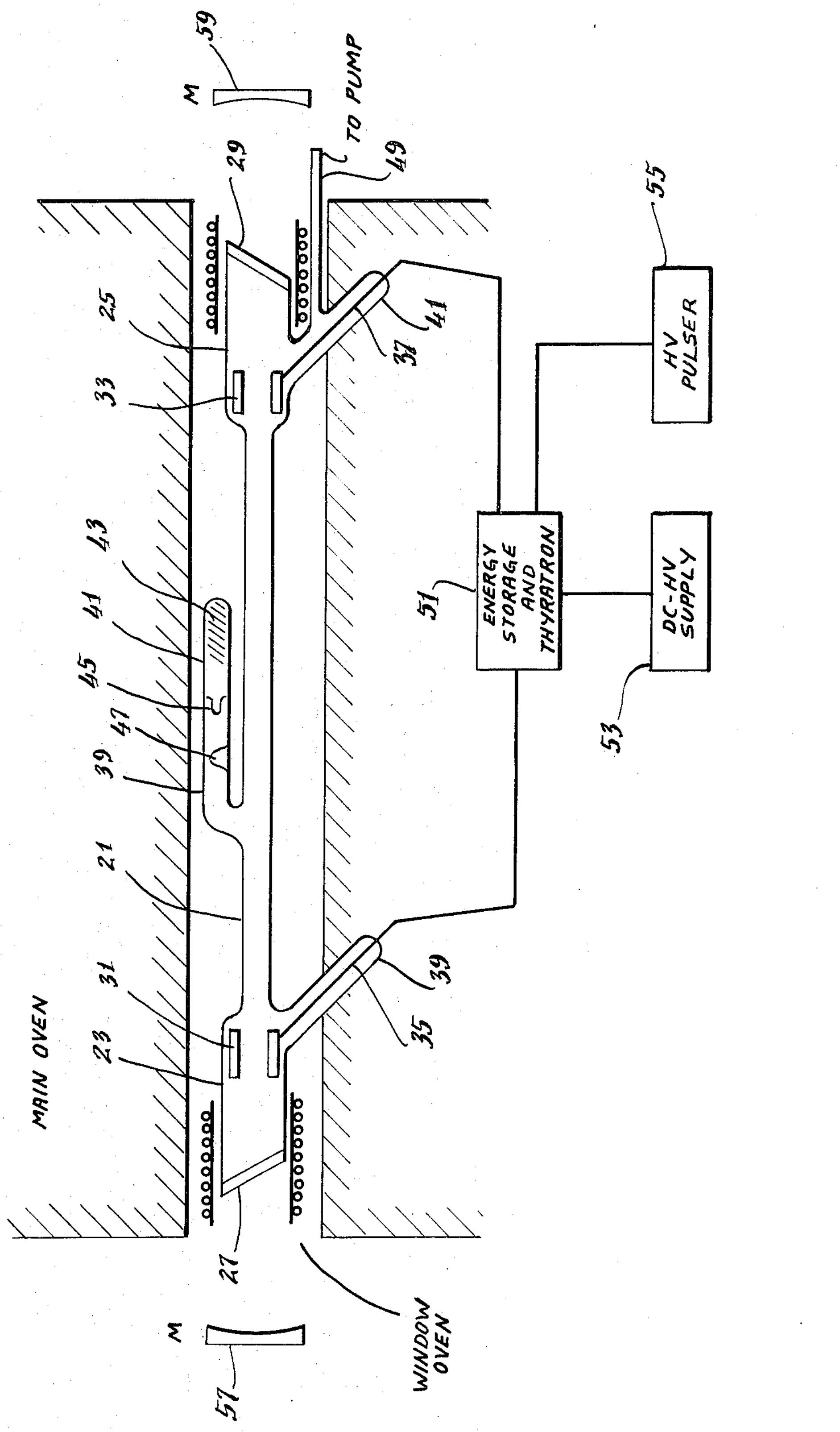
M
59
TO PUMP
29
49
25
33
37
41
55
HV PULSER
43
41
45
47
39
51
ENERGY STORAGE AND THYRATRON
DC-HV SUPPLY
53
21
31
39
35
23
MAIN OVEN
27
M
57
WINDOW OVEN

FLUORESCENT ORGANIC COMPOUND LASER

The invention herein described was made in the course of or under a contract or subcontract thereunder with the U.S. Navy.

BACKGROUND OF THE INVENTION

This invention relates to lasers. More particularly, this invention relates to fluorescent organic compound lasers. Lasers in which the active material is a fluorescent organic compound in the liquid state are well known in the art. Such lasers require a broad-band light source as the excitation means. Examples of such lasers may be found in U.S. Pat. No. 3,677,959 and U.S. Pat. No. 3,681,252. Since the conversion of electrical energy into a broad-band light source is usually a low-efficiency process, the overall efficiency of this type of laser is limited.

It would be desirable to provide a laser utilizing an organic fluorescent compound as the active material wherein excitation could be achieved electrically so as to avoid the aforementioned limitation.

OBJECTS OF THE INVENTION

It is, therefore, an object of this invention to provide a novel laser.

A further object of this invention is to provide a novel laser wherein the active material is a fluorescent organic compound.

It is a further object of this invention to provide a laser wherein the active material is a fluorescent organic compound and wherein pumping is achieved by non-optical means.

These and still further objects, features and advantages of the present invention will become apparent upon consideration of the following detailed disclosure.

BRIEF SUMMARY OF THE INVENTION

These and still further objects of the present invention are achieved, in accordance therewith, by providing a laser wherein the active material is a highly fluorescent, aromatic organic compound in the vapor phase and wherein the active material is excited by an electrical pulse discharge. Examples of typical materials are perylene, coronene, p-terphenyl, 1,6-diphenyl-hexa-1,3,5-triene, 9,10-diphenyl-anthracene, and 1,4-bis-2-(4-methyl-5-phenyloxazolyl) benzene.

In a liquid type fluorescent organic compound laser, laser action follows the building up of population inversion between sublevels of the ground electronic state $S_0$ and the excited electronic singlet state $S_1$. Population inversion is achieved in a pseudo-four-level scheme, whereby the levels involved in the optical pumping process are different from the levels involved in the radiative (lasing) transition. This occurs because: (*a*) the electronic levels have a complex vibrational-rotational substructure; (*b*) because the internal relaxation of energy within each electronic level is much faster ($\sim 10^{-11}$ sec) than the radiative lifetimes ($\sim 10^{-8}$ sec); and (*c*) because of the shift (Stokes-shift) in the equilibrium position of the potential energy surfaces of the ground and excited electronic states. In solution the fast internal relaxation is insured by collisions with solvent molecules. This, in turn, is reflected in certain characteristic properties of the fluorescence from these solutions; namely, Stokes shift and mirror symmetry of absorption and emission bands; quantum yield and shape of emission bands independent of exciting wavelength $\lambda_{exc}$; and finally one common decay time over the entire emission band.

In a fluorescent organic compound laser according to our invention, the deactivation processes of the fluorescent compounds are characterized by fast internal relaxation even in the gaseous phase and at low pressures (less than 1 torr), where the number of collisions per second with other molecules is several orders of magnitude smaller than in solution.

This is because the particular molecular compounds used can act as their own heat reservoir and can redistribute very rapidly the excess vibrational energy amongst the available quasi-dense structure of vibrational-rotational sublevels. This is clearly demonstrated, for instance, in the case of perylene, where the Stokes shift and mirror-symmetry are observed both in solution and in the vapor phase, and where the emission band in the vapor is independent of the exciting wavelength $\lambda_{exc}$.

The compounds utilized in this invention can be vaporized without decomposition and without loss of their fluorescent properties. In addition, their vapor emission in buffered-discharges is that of the molecular species itself.

Typical compounds are perylene, coronene, p-terphenyl, 1,6-diphenyl-hexa-1,3,5-triene, 9,10-diphenylanthracene, and 1,4-bis-2-(4-methyl-5-phenyloxazolyl) benzene.

The level of gain that can be derived from this type of laser will now be discussed. Liquid type fluorescent organic compound lasers are generally high-gain systems, so that even a reduction of quantum yield for fluorescence in the vapor phase leaves enough gain to overcome the usual optical losses, i.e., absorption and scattering at windows and mirrors, and light scattering the active medium itself.

In this invention, the light-scattering losses are much less serious than in dye solutions, where the liquid becomes optically quite inhomogeneous under flash lamp excitation.

Typical laser oscillation in a liquid phase fluorescent organic compound laser requires a population inversion (practically coincident with the excited-state population) of the order of $10^{13} - 10^{14}$ particles per cc. At temperatures of 240° C, corresponding typically to one torr vapor pressure of one of the compounds considered, the number density is $4 \cdot 10^{16}$ N/cc. This number corresponds to that of a $10^{-4}$ M/liter solution, as commonly employed in flashlamp-excited solution dye-lasers. In order to sustain laser oscillation in a glow discharge, the probability of excitation of the organic molecules should be at least 2 percent, a condition that should be easily met.

Several beneficial effects ensue from using a noblegas buffer. The gas is necessary for a "cold" start of the discharge. The task of electron-production in the Townsend avalanche should preferentially devolve for the noble gas, rather than to the organic compound. At low vapor pressures of the organic fill, the buffer gas reduces, by inelastic and elastic collisions, the number of highly energetic electrons, which would otherwise decompose the organic component. For this purpose the heavier Argon, Xenon and Krypton are to be preferred to the less-easily ionized helium and neon.

In addition, collision of the excited, fluorescing molecules with the buffer gas will favor internal relaxation processes in the organic vapor.

Finally, one may want to minimize any interaction of the electrodes with the organic fill. This could be achieved by confining the excitation of the organic constituent to a hot region of the discharge tube. The electrodes in this configuration would be kept at room temperature and the buffer gas will "carry" the discharge from electrode to electrode across the "hot" region.

The construction of the laser in this invention does not substantially differ from that of known internally excited gas lasers (helium-neon, argon ion, and nitrogen). The main difference is the low vapor pressure of the active material at room temperature. In order to build up the active material to a partial pressure of .1 torr to ~1 torr, one can rely on the heat developed on running the discharge through a buffer gas. Alternatively, the temperature of the discharge tube envelope can be raised by surrounding it with heating tapes, or by inserting the tube inside an oven.

In one possible arrangement the entire discharge tube is heated inside an oven (of the Clam-Shell type, for the sake of convenience). The window temperature is kept higher by small additional ovens so as to minimize the risk of condensation on the inside surfaces of the discharge-tube windows.

In an alternative arrangement the windows and electrodes of the discharge tube are at room temperature. This arrangement has several advantages (no electrode reactions, no window ovens, no special requirements for sealing the windows to the tube body), but also the draw back that the organic fill will slowly condense in the cold regions of the tube. Accordingly, operating time is limited to the time required for the chemical charge to be slowly transported to the cold region of the discharge tube.

BRIEF DESCRIPTION OF THE DRAWINGS

The sole FIGURE is a schematic view of a laser constructed according to this invention.

DESCRIPTION OF PREFERRED EMBODIMENT

A length of pyrex tubing 21 (28 cm), 10 mm O.D. and 8 mm I.D. is sealed at both ends to two wider pyrex sections 23 and 25 (19 mm O.D.; 17 mm I.D.) 10 to 15 cm long, which in turn support light transmitting windows 27 and 29. Electrodes 31 and 33 at opposite ends of the tube 21 are cylindrical sections of stainless steel tubing 20 mm long, 12 mm O.D. and 9 mm I.D. The electrodes 31, 33 are supported so that the axis of the cylinders are coinciding with the axis of the pyrex tubing 21 by means of Kovar rods 35, 37, 1 mm O.D. and 30 mm long, which are threaded into the electrodes 31, 33. The Kovar rods 35, 37 are sealed to compatible glass, 39, 41, and this in turn is sealed to the pyrex body of the discharge tube 21 via an intermediate glass grade (not shown).

At 5 cm from one of the electrodes 33, and in the narrow-bore section of the discharge tube 21, a glass side arm 39 starts from the tube 21, bends, and runs parallel to it, at 3 cm from the tube axis. An evacuated sealed ampoule 41 containing a quantity of the organic constituent 43 in powdered form is sealed to said side-arm. The ampoule 41 terminates with a thin pyrex hook 45. A pyrex coated magnet 47 is also inserted in said side arm. The magnet can be operated from outside and by breaking the thin pyrex hook, establishes a connection for the flow of vapor from the ampoule to the discharge region.

The windows 27 and 29 that complete the discharge tube in the axial direction can be either pyrex or quartz. The chemically "cleanest" way to connect the windows to the supporting surfaces (cut to the Brewster angle) is by optically "contacting" optically polished windows and terminal tube surfaces.

When UV radiation has to be transmitted, the windows 27 and 29 should be quartz. In such a case, the discharge tube will either be entirely built of quartz, or have a pyrex-quartz grade between the electrode region and the window supports.

A side-tubulation 49 in the wide bore section of the tube, as removed as possible from the side-arm containing the chemical charge, is used to connect the tube to a pumping station, and to provide the appropriate pressure of buffer gas. Electrodes 31 and 33 are connected to an energy storage and thyratron device 51 which in turn is coupled to a DC-High Voltage Supply 53 and a High Voltage pulser 55. Two reflective mirrors 57 and 59 are located along the tube axis. When the two mirrors are perfectly aligned with respect to the discharge-tube axis, a resonator configuration suitable for the observation of laser action, is then established. A convenient alignment procedure, prior to running the discharge in the organic fill-rare gas mixture, is as follows. The discharge tube is filled with 10$\mu$ of argon. A pulse discharge, typically 3.5 nF at 20 KV, will produce, with suitable mirrors reflecting in the blue region of the spectrum, laser action at 4763A, when the mirrors are aligned with the tube and amongst themselves.

After the alignment, the desired pressure of noble gas buffer is admitted to the tube, the magnet is operated to open a connection between the organic fill and the discharge tube. Next, the tube temperature is raised. Pulsed discharge in the tube will at first have the emission characteristic of the noble-gas buffer. With the building up in the pressure (from ~.1 torr) of the organic constituent, the molecular emission from it will replace the emission from the buffer gas.

When the rate of production of excited molecules of the dye is high enough, there should appear indication of optical gain, as revealed by a ratio $$I_1/I_2 > 2,$$

with $I_1$ light from the cavity monitored in the resonator-axis direction, $I_2$ light from the cavity monitored in the resonatoraxis direction, but when the far-away mirror is mis-aligned or covered. Optimizing the conditions that provide gain will achieve laser emission.

Excitation is provided by charging a capacitor bank (3.5 to 7.5 nf) in the voltage range 6–15 KV. The high voltage side of the capacitor bank is connected to one electrode of the discharge tube. The capacitor bank can be shorted by an E.G.G. HY 32 thyratron 51, activated by a 2 KV pulse from a Velonex Pulser 53. When this occurs, the energy stored in the capacitor bank is dumped in the discharge tube 21.

The dielectric mirrors 57 and 59 are about 99 percent reflective in the spectral region of the peak of the molecular fluorescence band. For compounds emitting in the blue cavity alignment of the mirrors is achieved utilizing laser action in argon at 4,763 A., while for UV emitters alignment of the mirrors is achieved utilizing nitrogen lasing at 3,371 A.

DESCRIPTION OF SPECIFIC EMBODIMENT

EXAMPLE I

The chemical fill is 750 mg para-terphenyl. Nitrogen lasing is used to align the cavity. Argon buffer at 1.5 torr pressure is present. The center of the discharge tube is at 165° C and a dirty white, broad discharge is observed. The output from the cavity axis, at 15 KV, indicated gain at 3,800 A., near the peak of the p-terphenyl vapor emission band.

While the present invention has been described with reference to specific embodiments thereof, it will be understood by those skilled in this art that various changes may be made without departing from the true spirit and scope of the invention. In addition, many modifications may be made to adapt a particular situation, material, apparatus, process or then present objective to the spirit of this invention without departing from its essential teachings.

What is claimed is:

1. In a discharge-excited laser, an active medium in the form of vaporized p-terphenyl, the partial pressure of said p-terphenyl being, at operating temperature, about 0.1 torr to about 1 torr, and a small quantity of a noble or inert gas selected from the group consisting of argon, helium, neon, xenon and krypton.

2. The laser of claim 1 wherein said inert gas is argon.

* * * * *